(12) United States Patent
Ng

(10) Patent No.: US 11,215,009 B2
(45) Date of Patent: Jan. 4, 2022

(54) ROTARY DRIVE SYSTEM FOR A ROLLER BLIND

(71) Applicant: ZMC Metal Coating Inc., Woodbridge (CA)

(72) Inventor: Philip Ng, Thornhill (CA)

(73) Assignee: V.B. KOTING MANAGEMENT INC., Woodbridge (CA)

( * ) Notice: Subject to any disclaimer, the term of this patent is extended or adjusted under 35 U.S.C. 154(b) by 399 days.

(21) Appl. No.: 16/358,829

(22) Filed: Mar. 20, 2019

(65) Prior Publication Data

US 2019/0330919 A1 Oct. 31, 2019

Related U.S. Application Data

(60) Provisional application No. 62/662,448, filed on Apr. 25, 2018.

(51) Int. Cl.
*E06B 9/76* (2006.01)
*E06B 9/44* (2006.01)
*F16H 1/46* (2006.01)

(52) U.S. Cl.
CPC .............. *E06B 9/76* (2013.01); *E06B 9/44* (2013.01); *F16H 1/46* (2013.01)

(58) Field of Classification Search
None
See application file for complete search history.

(56) References Cited

U.S. PATENT DOCUMENTS 4,417,185 A * 11/1983 Bullat .................. E06B 9/74
 318/2
6,910,516 B2 * 6/2005 Huang .................. E06B 9/322
 160/168.1 R

* cited by examiner

*Primary Examiner* — Erin D Bishop
(74) *Attorney, Agent, or Firm* — Emerson, Thomson & Bennett, LLC; Roger D. Emerson

(57) ABSTRACT

A rotary drive system for a roller blind. The drive system comprises a handle a worm gear, a bull gear, and a planetary gear drive system. The handle causes rotation of the worm gear, that engages the bull gear, that engages the planetary gear carrier of the planetary gear drive system. The sun gear of the planetary gear drive system is configured to engage the roller tube of the roller blind. Rotation of the worm gear causes a rotation of the bull gear which rotates the planetary gear carrier, causing the planetary gears to impart rotational motion to the sun gear and rotation of the roller tube at a rate faster than the rotation of the worm gear, said planetary gear carrier causing said planetary gears to impart rotational motion to said sun gear and rotation of the roller tube at a rate faster than the rotation of said worm gear.

7 Claims, 7 Drawing Sheets

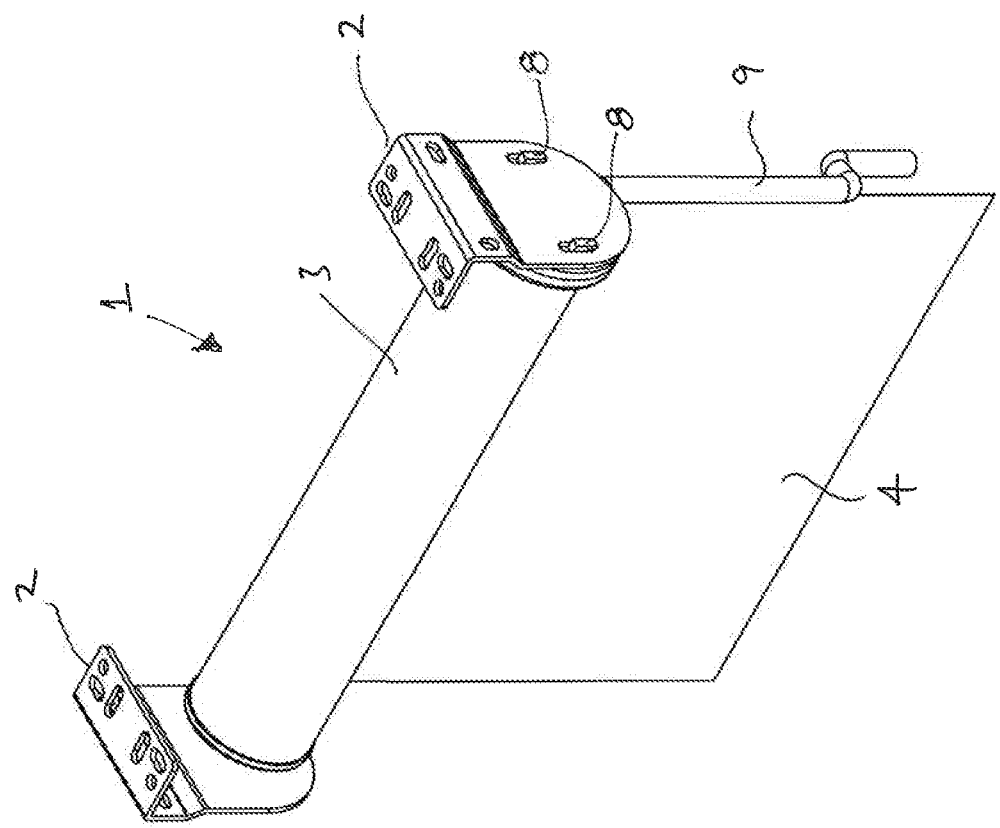

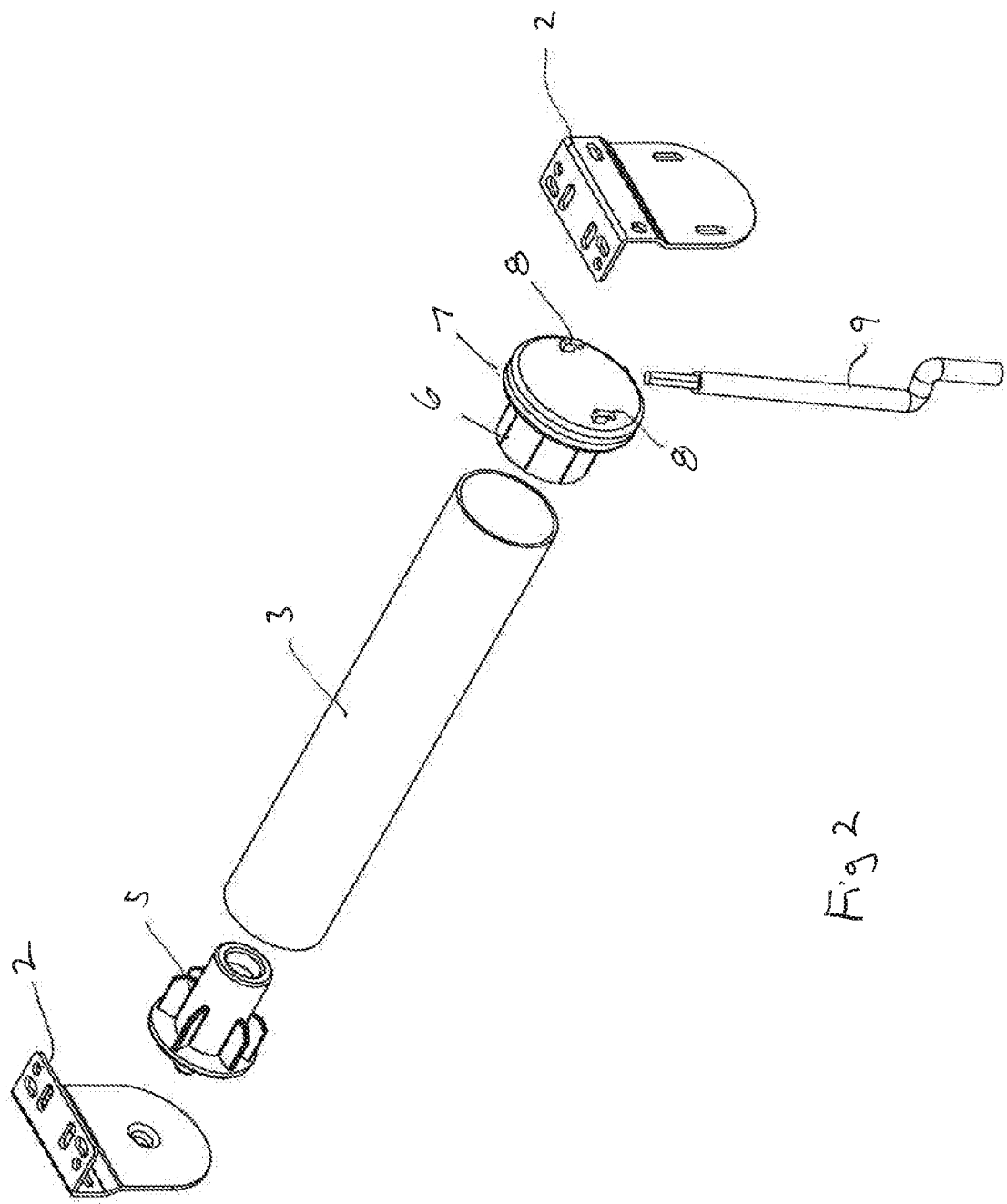

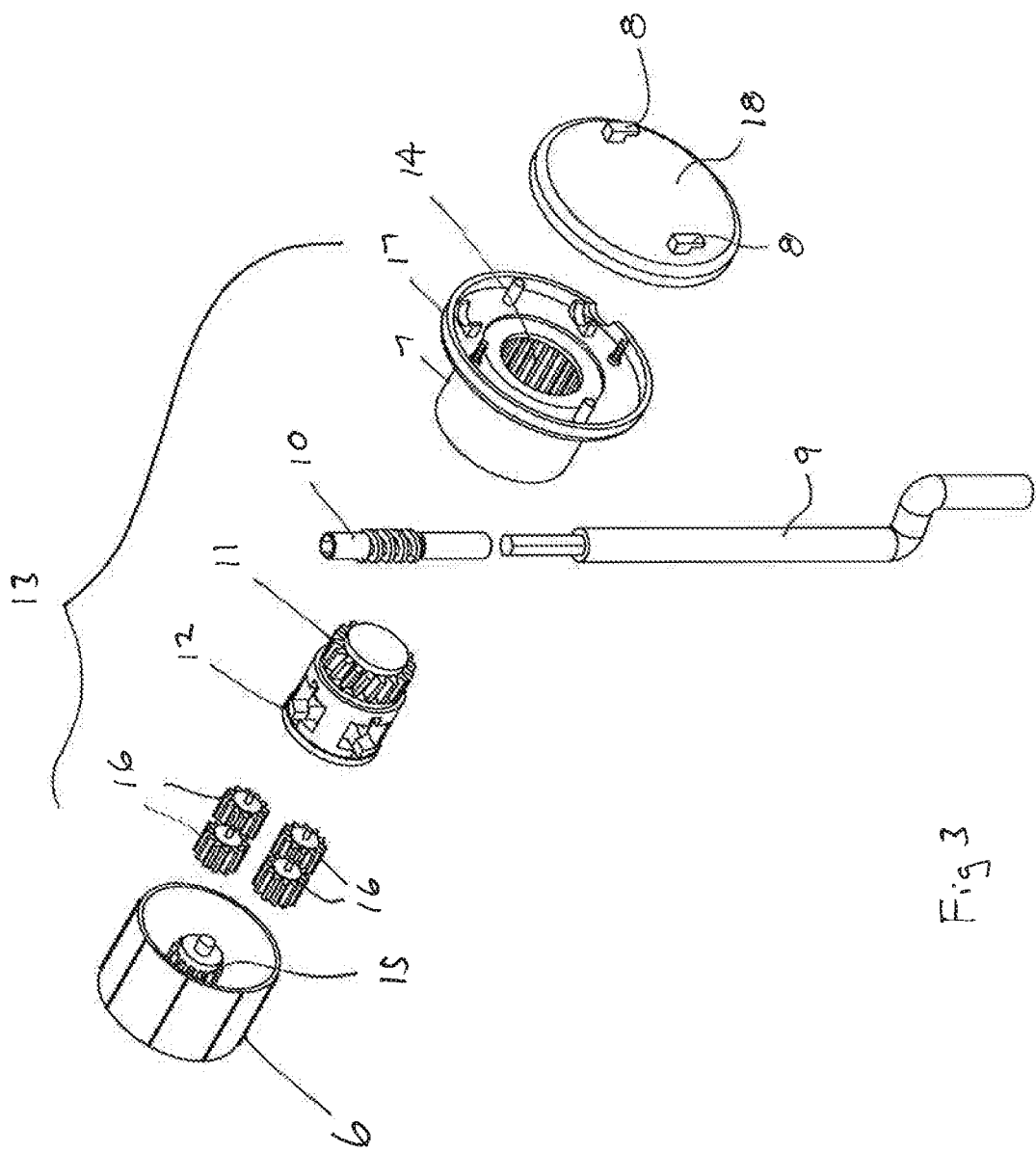

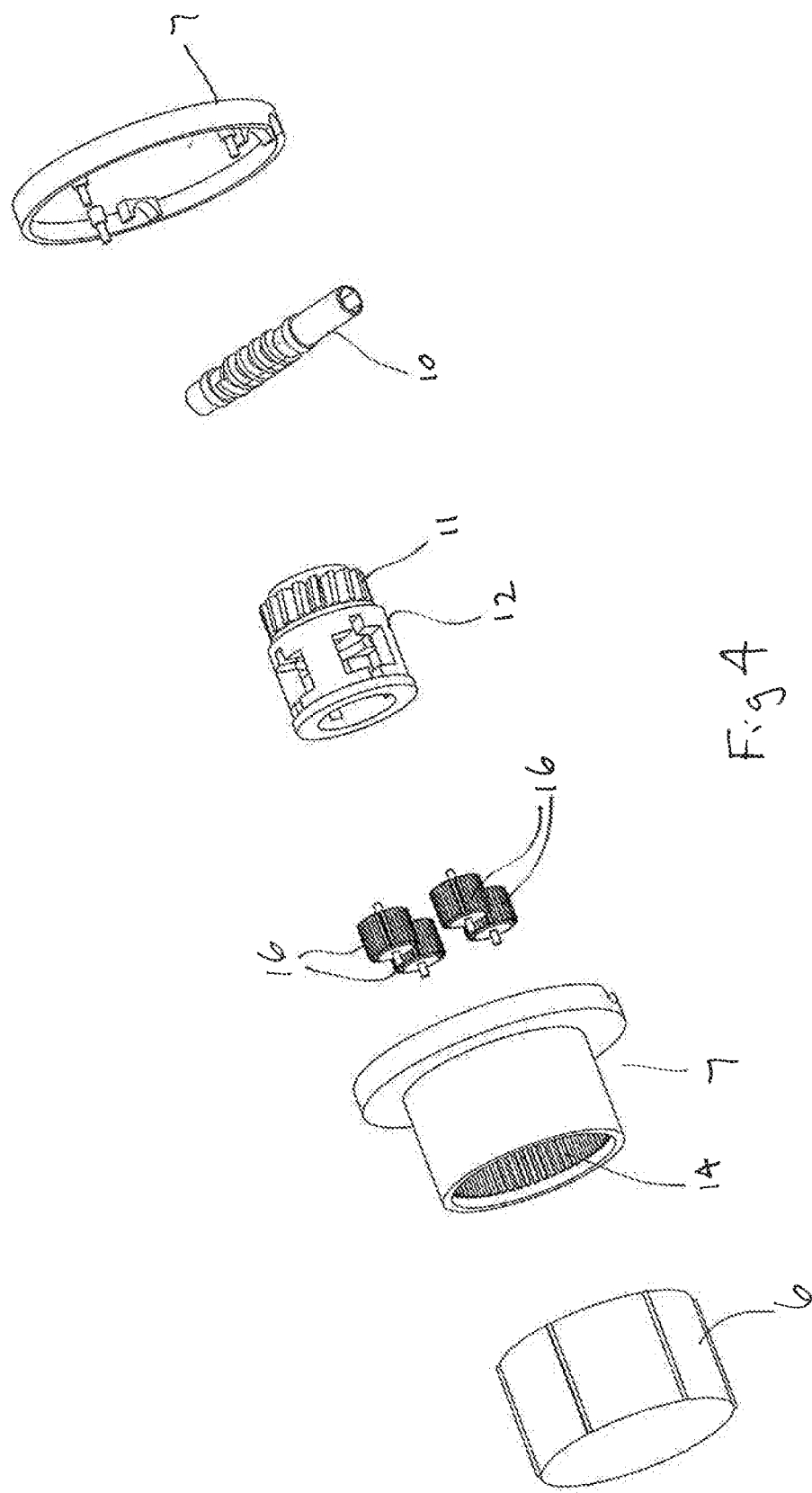

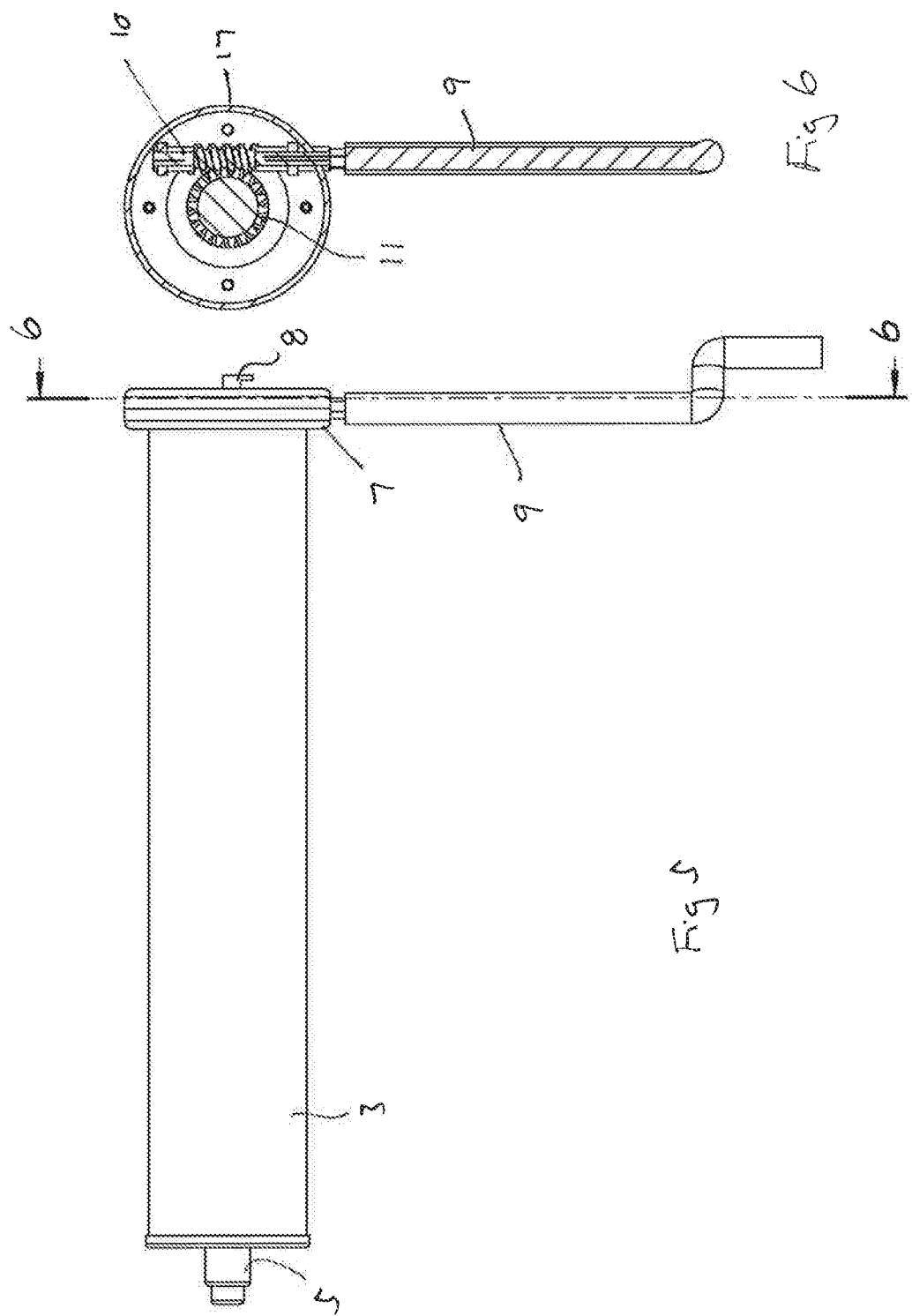

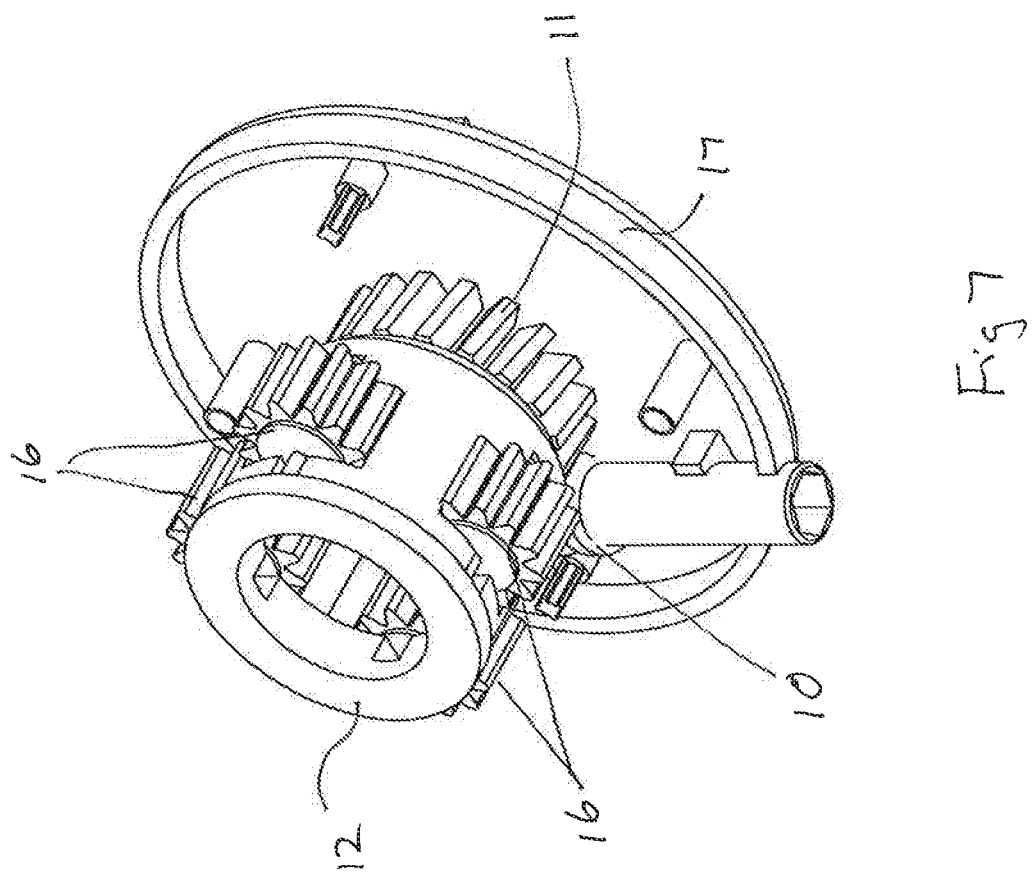

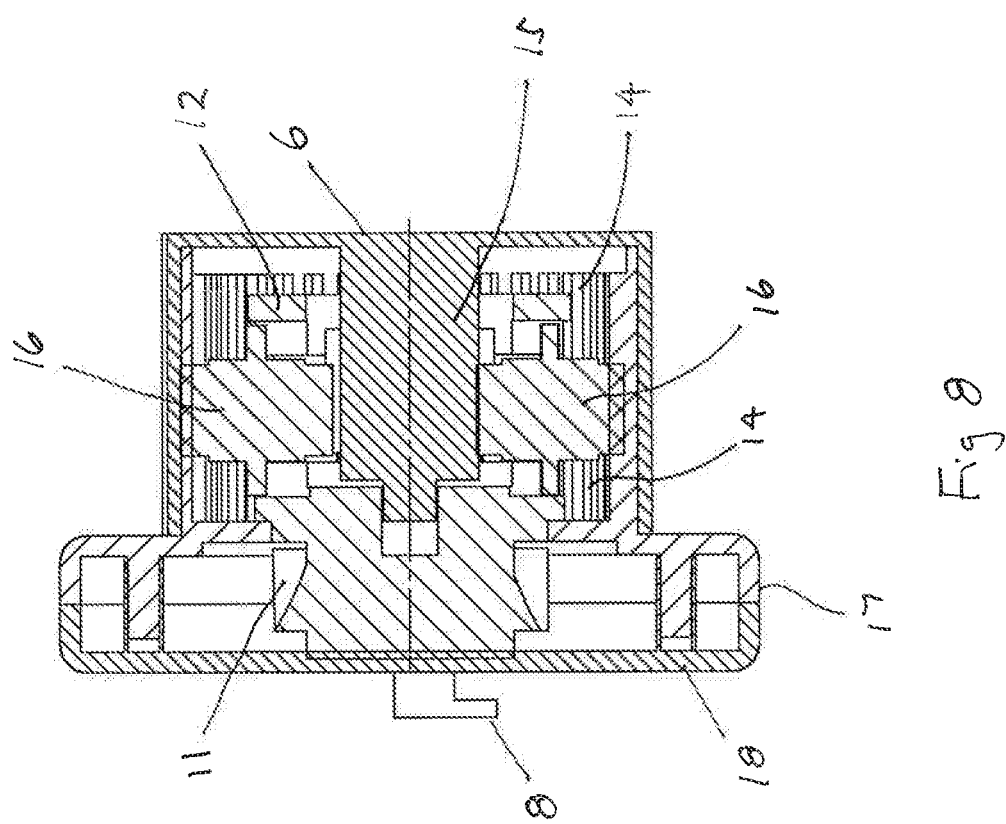

ROTARY DRIVE SYSTEM FOR A ROLLER BLIND

FIELD

This invention relates generally to roller blinds, or window shades as they are sometimes referred to, and in particular to a rotary drive system for a roller blind.

BACKGROUND

Roller blinds are commonly used to limit light intrusion through a window or opening. A roller blind is typically comprised of a length of blind fabric, wound about a roller tube that is supported between a pair of end brackets that are mounted upon, or adjacent to, a window frame. A drive mechanism is employed to rotate the roller tube in one direction or the other in order to deploy or retract the fabric from the tube. Most commonly a looped cord or chain is used in association with a clutch mechanism at one end of the roller tube to impart rotational movement to the tube in one direction or the other. While such cords or chains are efficient at rotating the roller tube in order to raise or lower the blind fabric, they can present a strangulation danger for small children and pets. For that reason, many jurisdictions require such cords or chains to be rigidly mounted to the window frame in order to minimize any strangulation potential. Mounting cords or chains to the side of the window frame requires additional physical structures and results in increased costs from both a material and installation labour stand point. For that reason, others have proposed using a handle or wand to operate a blind. An individual rotates the handle or wand in one direction or the other in order to either raise or lower the blind fabric. Handles or wands eliminate strangulation potential, but require a high number of rotations to wind or unwind the blind fabric, making the deployment or retraction of the blind a slow process. Rotating the roller tube of a roller blind in a manner that minimizes strangulation potential, but that still permits the blind fabric to be raised or lowered at a speed that is acceptable to consumers, is desired.

SUMMARY

In one aspect the invention provides a rotary drive system for a roller tube of a roller blind, the rotary drive system comprising a handle having a longitudinal axis and configured to attach to and cause rotation of a worm gear when said handle is rotated about said longitudinal axis; a bull gear configured to engage said worm gear such that rotation of said worm gear in a first longitudinal direction causes rotation of said bull gear in a first direction perpendicular to said first longitudinal direction, and rotation of said worm gear in an opposite longitudinal direction causes rotation of said bull gear in an opposite second direction perpendicular to said first longitudinal direction; and a planetary gear drive system comprising a ring gear, a sun gear, a planetary gear carrier and a plurality of planetary gears, said bull gear configured to engage said planetary gear carrier such that rotation of said bull gear causes rotation of said planetary gear carrier along a common axis, said sun gear configured to engage the roller tube of the roller blind, wherein rotation of said worm gear causes a rotation of said bull gear which rotates said planetary gear carrier causing said planetary gears to impart rotational motion to said sun gear and rotation of the roller tube at a rate faster than the rotation of said worm gear.

In another aspect the invention provides a rotary drive system for a roller tube of a roller blind, the rotary drive system comprising a handle having a longitudinal axis, said handle configured to impart rotary motion to a planetary gear carrier of a planetary gear system such that rotation of said handle in a first direction about said longitudinal axis causes a rotation of said planetary gear carrier in one direction and rotation of said handle in an opposite second direction about said longitudinal axis causes rotation of said planetary gear carrier in a second opposite direction; said planetary gear system comprising a sun gear configured to be secured to the roller tube of the roller blind, wherein rotation of said handle causes rotation of the planetary gear carrier, causing rotation of the sun gear, causing rotation of the roller tube at a speed faster than that of said handle.

The invention also provides a rotary drive system for a roller tube of a roller blind, the rotary drive system comprising a handle having a longitudinal axis and configured to attach to and cause rotation of a worm gear when said handle is rotated about said longitudinal axis; a bull gear configured to engage said worm gear such that rotation of said worm gear in a first axial direction causes rotation of said bull gear in a first direction and rotation of said worm gear in a second axial direction causes rotation of said bull gear in a second opposite direction, said bull gear configured to engage a planetary gear carrier of a first planetary gear system comprising a ring gear, a sun gear, said planetary gear carrier and a plurality of planetary gears, such said rotation of said bull gear causes rotation of said planetary gear carrier of said first planetary gear system, and a second planetary gear system, comprising a ring gear, a sun gear, a planetary gear carrier and a plurality of planetary gears, the sun gear of said second planetary gear system configured to be secured to the roller tube of the roller blind, the sun gear of the first planetary gear system configured to engage the planetary gear carrier of the second planetary gear system, wherein rotation of said bull gear causes rotation of said planetary gear carrier of said first planetary gear system, wherein rotation of said planetary gear carrier of said first planetary gear system causes rotation of said planetary gears of said first planetary gear system, wherein rotation of said planetary gears of said first planetary gear system causes rotation of said sun gear of said first planetary gear system, wherein rotation of said sun gear of said first planetary gear system causes rotation of said planetary gear carrier of said second planetary gear system, wherein rotation of said planetary gear carrier of said second planetary gear system causes rotation of said planetary gears of said second planetary gear system, wherein rotation of said planetary gears of said second planetary gear system causes rotation of said sun gear of said second planetary gear system, and wherein rotation of said sun gear of said second planetary gear system causes rotation of said roller tube at a rate faster than a rotation of said handle.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which:

FIG. 1 is an upper side perspective view of a roller blind constructed in accordance with an embodiment of the invention.

FIG. 2 is a partially exploded view of the roller blind of FIG. 1 having the blind fabric removed.

FIG. 3 is an exploded view of the drive system of the roller blind shown in FIG. 1.

FIG. 4 is a side elevational exploded view of a portion of the drive system shown in FIG. 3.

FIG. 5 is a side elevational view of the roller tube of the blind shown in FIG. 1 together with its drive system.

FIG. 6 is a sectional view taken along the line 6-6 of FIG. 5.

FIG. 7 is a lower perspective view of the drive system end plate, worm gear/bull gear drive, planetary gear carrier and planetary gears of the roller blind drive system.

FIG. 8 is a vertical cross section of the roller blind drive system.

DESCRIPTION

The present invention may be embodied in a number of different forms. The specification and drawings that follow describe and disclose some of the specific forms of the invention.

With reference to the attached drawings there is shown a roller blind or roller shade 1 that is comprised generally of a pair of end brackets 2 which support a roller tube 3 upon which blind fabric 4 is wound. Typically, roller tube 3 will be hollow in nature, or have hollow ends, one of which receives an idle end fitting 5 and the other which receives a roller tube drive fitting 6. Roller tube drive fitting 6 is rotationally connected to a rotary drive system housing 7 in a manner such that housing 7 supports roller tube drive fitting 6 while the roller tube drive housing can rotate as housing 7 remains stationary. Rotary drive housing 7 is typically secured to one of end brackets 2 (in the attached drawings through the use of hooks 8). In the embodiment depicted in the attached drawings, a handle or wand 9 is configured to engage rotary drive system housing 7 such that rotation of handle or wand 9 causes a rotation of roller tube drive fitting 6, which in turn rotates roller tube 3 in one direction or the other in order to wind or unwind blind fabric from about the surface of the roller tube.

In an embodiment of the invention handle 9 is configured to be attached or secured to a worm gear 10 such that rotation of the handle about its longitudinal axis causes a rotation of the worm gear. Worm gear 10 is in turn configured to engage a bull gear 11 such that rotation of the worm gear causes the bull gear to rotate in either a forward or reverse direction. It will be appreciated by one of ordinary skill in the art that in a worm gear/bull gear drive the axis of rotation of the bull gear is approximately perpendicular to that of the worm gear.

As shown, bull gear 11 is configured to engage a planetary gear carrier 12 of a planetary gear or epicyclic gear system 13. One of ordinary skill in the art will be well versed in planetary gear systems and will understand their component parts, the function of individual components, and the overall function of the planetary gear system. It will thus be understood that, as also shown in the attached drawings, planetary gear system 13 will be comprised generally of a ring gear 14, a sun gear 15, planetary gear carrier 12, and a plurality of planetary gears 16. In the embodiment of the invention shown, ring gear 14 is fixed to rotary drive system housing 7 such that it remains stationary during operation of the roller blind. Sun gear 15 is configured to be secured to roller tube 3 and may form part of or be secured to roller tube drive fitting 6. In one embodiment ring gear 14 is positioned on the inner surface of rotary drive system housing 7 such that planetary gear carrier 12 is positioned at least partially within housing 7. Planetary gear carrier 12 houses the plurality of planetary gears 16 and, as in the case of a standard planetary gear system, planetary gears 16 are configured to engage both ring gear 14 and sun gear 15. In this manner, rotation of bull gear 11 will cause a corresponding rotation of planetary gear carrier 12 along a common axis, thereby resulting in rotation of sun gear 15 through the engagement of the planetary gears with both the ring gear and the sun gear. The rotating sun gear will thus rotate roller tube drive fitting 6 and roller tube 3 to which the drive fitting is secured. While four planetary gears are shown in the attached drawings other numbers of planetary gears could be utilized.

In order to minimize light intrusion between the ends of roller blind 1 and a window frame about which it is mounted, in some embodiments it may be preferable to configure planetary gear system 13, roller tube drive fitting 6, and at least a portion of rotary drive system housing 7 such that they are sized to be received within the hollow end of roller tube 3. An exterior ring 17 and end cap 18 of rotary drive system housing 7 remain outside roller tube 3 and assist in securing housing 7 to end bracket 2 through use of hooks 8.

As mentioned, one of ordinary skill in the mechanical arts will be well versed in the structure and operation of planetary gear systems. It will therefore be appreciated that the above described structure presents a wide degree of customization in terms of the degree of speed enhancement that can provided through use of the planetary gear system. The relative sizes of the component gears and their respective and relative gear ratios can be chosen to impart a desired degree of speed enhancement to the rotation of the roller tube. It will further be appreciated that a planetary gear system in the environment of a roller tube drive system can be designed in a manner that helps to minimize both size in terms of diameter and overall length, both being desirable qualities when attempting to minimize light intrusion at the end of the blind and minimize the use of large and bulky blind components.

In an alternate embodiment, roller blind 1 includes a pair of planetary gear systems. In this embodiment bull gear 11 is secured to the planetary gear carrier of a first of the pair of planetary gear systems, with the sun gear of the first planetary gear system configured to engage the planetary gear carrier of the second of the pair of planetary gear systems. The sun gear of the second planetary gear system is configured to engage roller tube drive fitting 6. The utilization of a pair of planetary gear systems in series, as described, further enhances the ability to increase the rate of rotation of the roller tube relative to that of the handle while helping to minimize the diameter of the overall drive system.

It will thus be appreciated that through the structure described above and shown in the attached drawings, rotation of handle 9 in one direction will cause the roller tube to be rotated in a direction that retracts blind fabric onto the roller tube, while rotation of handle 9 in an opposite direction will cause blind fabric to be deployed from the roller tube. It will further be appreciated that the worm gear/bull gear structure will assist in preventing or limiting an undesired unwinding of fabric from the roller tube on account of the rotational torque applied to the roller tube by the weight of a fabric hanging downwardly therefrom. Further, one of ordinary skill in the art will appreciate that the described planetary gear system will cause the roller tube to rotate at a speed faster than the rotation of handle 9. That is, in the particular configuration of the planetary gear system utilized in the current invention, the planetary gear system acts as a speed multiplier not as a speed reducer. While the degree of speed enhancement of the roller tube can be altered as desired by altering the individual components of the planetary gear system, the use of the planetary gear system in association with roller blind 1 permits an operator to raise or lower the blind fabric without needing to impart an excessive number of rotations to handle 9. Further, the ability of the planetary gear system and many of the roller blind drive components to be received within the hollow end of roller tube 3 permits the end of the roller tube to terminate in close proximity to its associated end bracket, thereby helping to minimize the light gap or light intrusion between the end of the blind and the end bracket or window frame. The utilization of the described drive structure also permits it to be produced having a relatively small diameter, which again assists in the receipt of many of its component parts within the end of the roller tube, and provides the associated advantages.

It is to be understood that what has been described are the preferred embodiments of the invention. The scope of the claims should not be limited by the preferred embodiments set forth above, but should be given the broadest interpretation consistent with the description as a whole.

I claim:

1. A rotary drive system for a roller tube of a roller blind, the rotary drive system comprising:
    a handle having a longitudinal axis and configured to attach to and cause rotation of a worm gear when said handle is rotated about said longitudinal axis;
    a bull gear configured to engage said worm gear such that rotation of said worm gear causes rotation of said bull gear, said bull gear configured to engage a planetary gear carrier of a first planetary gear system comprising a ring gear, a sun gear, said planetary gear carrier and a plurality of planetary gears, such said rotation of said bull gear causes rotation of said planetary gear carrier of said first planetary gear system, and
    a second planetary gear system, comprising a ring gear, a sun gear, a planetary gear carrier and a plurality of planetary gears, the sun gear of said second planetary gear system configured to be secured to the roller tube of the roller blind, the sun gear of the first planetary gear system configured to engage the planetary gear carrier of the second planetary gear system, wherein rotation of said bull gear causes rotation of said planetary gear carrier of said first planetary gear system, wherein rotation of said planetary gear carrier of said first planetary gear system causes rotation of said planetary gears of said first planetary gear system, wherein rotation of said planetary gears of said first planetary gear system causes rotation of said sun gear of said first planetary gear system, wherein rotation of said sun gear of said first planetary gear system causes rotation of said planetary gear carrier of said second planetary gear system, wherein rotation of said planetary gear carrier of said second planetary gear system causes rotation of said planetary gears of said second planetary gear system, wherein rotation of said planetary gears of said second planetary gear system causes rotation of said sun gear of said second planetary gear system, and wherein rotation of said sun gear of said second planetary gear system causes rotation of said roller tube at a rate faster than a rotation of said handle.

2. The drive system as claimed in claim 1 wherein said ring gear of said first planetary gear system is configured to be operatively secured to an end bracket of the roller blind, said ring gear remaining stationary upon the rotation of said worm gear and the roller tube.

3. The drive system as claimed in claim 2 wherein said sun gear of said second planetary gear system forms part of or is secured to a roller tube drive fitting which is configured to engage an end of the roller tube.

4. The drive system as claimed in claim 1 wherein said ring gear of said first planetary gear system is positioned on an inner surface of a rotary drive system housing, said planetary gear carrier of said first planetary gear system received at least partially within said housing.

5. The drive system as claimed in claim 4 wherein said sun of said second planetary gear system gear forms part of or is configured to engage a roller tube drive fitting, said roller tube drive fitting, and at least a portion of said rotary drive system housing, being configured and sized to be received within a hollow end of the roller tube.

6. The drive system as claimed in claim 4 wherein said rotary drive system housing is securable to an end bracket of the roller blind.

7. The drive system as claimed in claim 4 wherein said first and said second planetary gear systems, a roller tube drive fitting, and at least a portion of said rotary drive system housing are configured and sized to be received within a hollow end of the roller tube.

* * * * *